Figure 1:
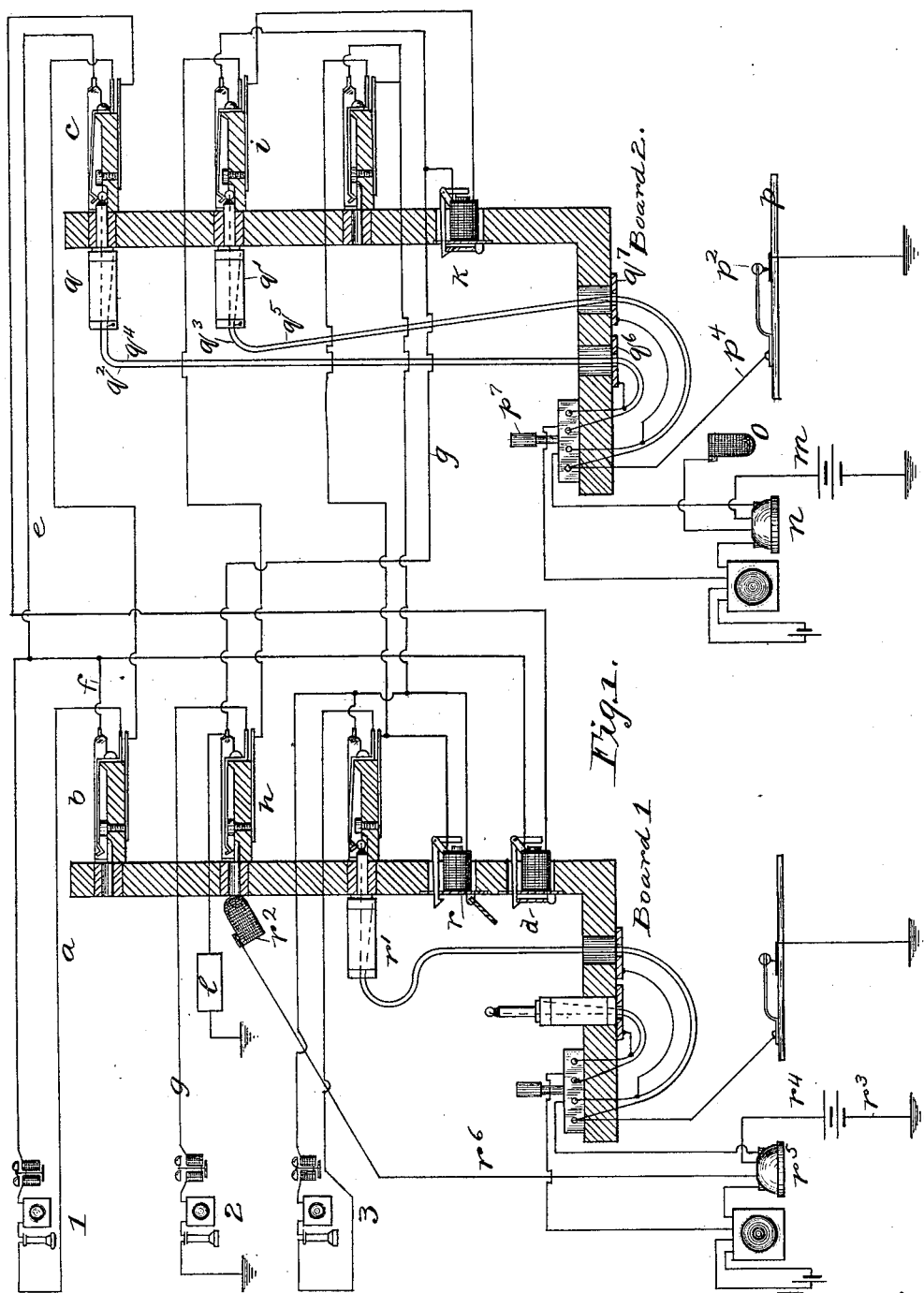

(No Model.)  3 Sheets—Sheet 3.

J. J. O'CONNELL.
TESTING APPARATUS FOR MULTIPLE SWITCH BOARDS.

No. 403,483. Patented May 14, 1889.

Witnesses:
Chas. G. Hawley.
Chas. C. Woodworth

Inventor:
Joseph J. O'Connell,
By George P. Barton,
Attorney.

UNITED STATES PATENT OFFICE.

JOSEPH J. O'CONNELL, OF CHICAGO, ILLINOIS, ASSIGNOR TO THE WESTERN ELECTRIC COMPANY, OF SAME PLACE.

TESTING APPARATUS FOR MULTIPLE SWITCH-BOARDS.

SPECIFICATION forming part of Letters Patent No. 403,483, dated May 14, 1889.

Application filed October 22, 1888. Serial No. 288,819. (No model.)

*To all whom it may concern:*

Be it known that I, JOSEPH J. O'CONNELL, a citizen of the United States, residing at Chicago, in the county of Cook and State of Illinois, have invented a certain new and useful Improvement in Testing Apparatus for Multiple Switch-Boards, (Case 2,) of which the following is a full, clear, concise, and exact description, reference being had to the accompanying drawings, forming a part of this specification.

My invention relates to telephone-exchange systems in which multiple switch-boards are employed; and its object is to provide ready means for testing a line called for at one board to determine whether the line is in use or connected at any other of the boards, Heretofore different forms of apparatus and different circuits have been employed for this purpose.

My system of circuits and apparatus herein described is designed for use in exchanges in which metallic circuits are employed, or in which both metallic and single circuits are used conjointly upon the same switch-boards, the act of testing being the same, whether the line tested be a single wire or ground circuit or a complete metallic circuit.

My invention consists in providing a branch circuit to ground through a variable contact in connection with each pair of cords and testing apparatus for each operator at the different boards, consisting of a ground-circuit, including a battery and a telephone or other indicating apparatus, by means of which it may be determined, on closing the battery to the test-piece of any switch upon one board, whether the line with which said switch is connected is busy—that is, connected with another line upon some other of the switch-boards.

My invention also consists in certain switching apparatus or loop-key devices, by means of which the operator's telephone and the clearing-out annunciator are alternatively looped into the connecting-cords. I preferably provide resistance in the ground-circuits of the different cords, and preferably run these ground-circuits in two branches from the variable contact, including resistance, say, of two thousand ohms in each branch thereof, the different branches being so arranged in connection with the loop-key as to be connected to different sides or opposite limbs of the telephone-circuits. By thus providing two branches with high resistance in each branch I am enabled to test not only metallic circuits, but single circuits, or a single circuit connected with a metallic circuit.

As will be hereinafter more fully described, a sound will be heard in the telephone when the test is made, in case the line is busy, and if the line is free no sound or vibration will be heard, except that in case the line tested is a grounded line a simple click will be heard in the telephone.

Figure 2:
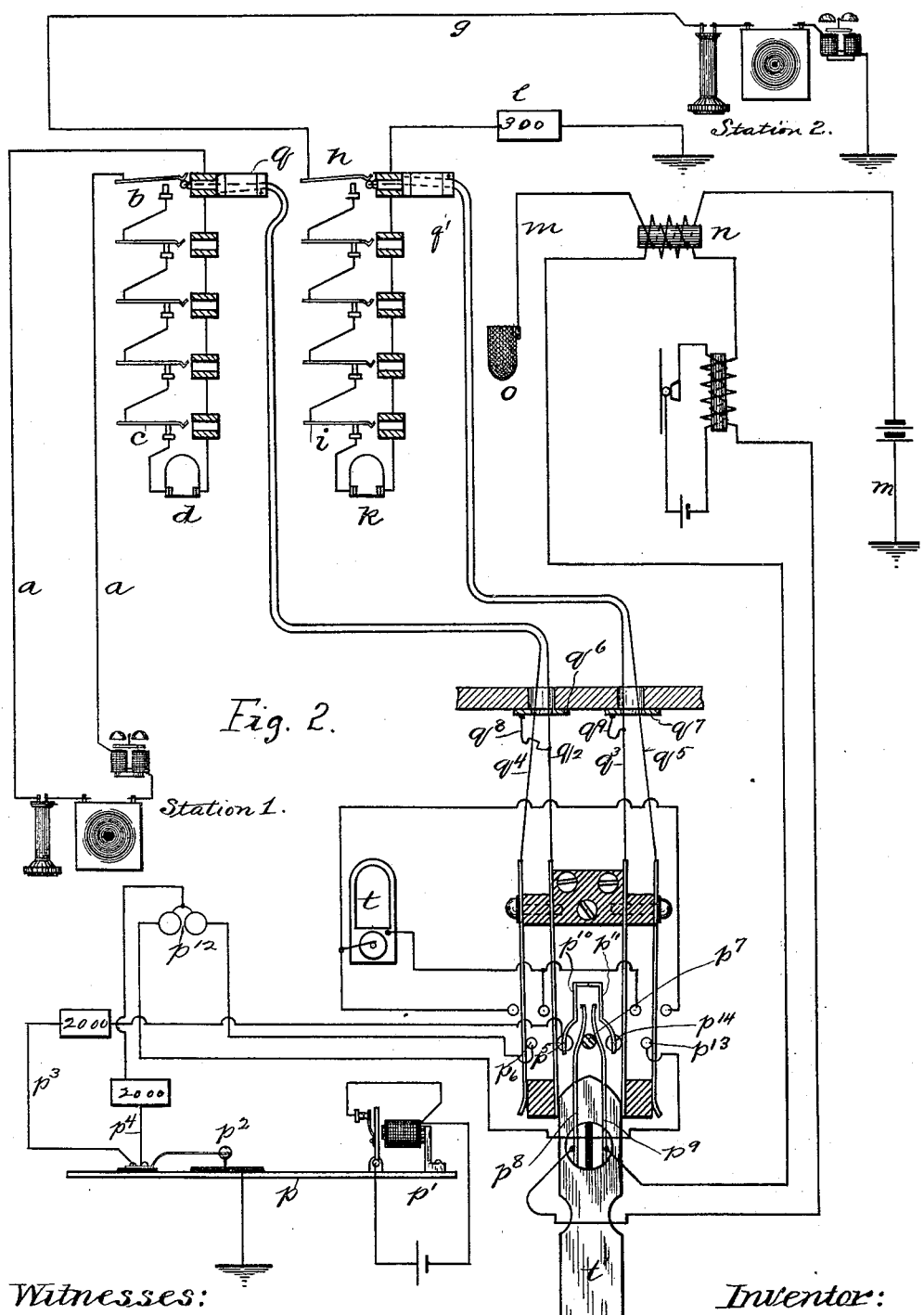
Figure 3:
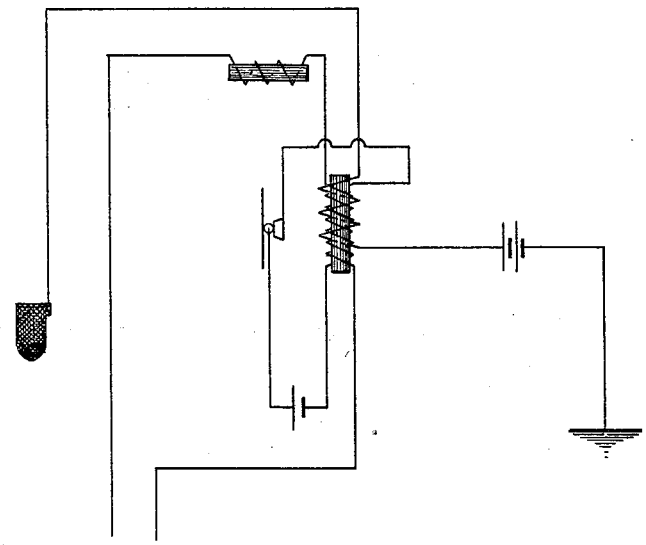
Figure 4:
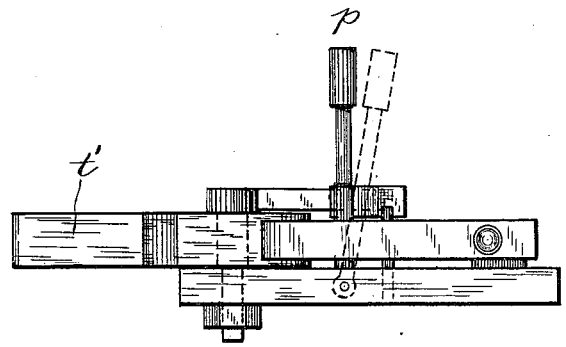

In the drawings, which are illustrative of my invention, Figure 1 is a diagram showing three telephone-lines each connected with a different spring-jack on each of two switch-boards and each through its individual annunciator. Fig. 2 is a diagram illustrative of two telephone-lines—one metallic and the other single—each connected with its series of spring-jack switches, the testing apparatus and test-circuits being shown in detail. Fig. 3 is a diagram showing a battery and the test-terminal of a grounded circuit connected through a third winding of the telephone outfit induction-coil. Fig. 4 is a side elevation of the switch which I preferably use as a part of my testing apparatus.

As shown in Fig. 1, telephone-line $a$ extends from station 1 to spring-jack switch $b$ upon the first board, and through the spring and contact of said switch to switch $c$ upon the second board, and thence normally through the spring and contact of said switch $c$, through the annunciator $d$, which is shown upon the first board, and thence back to station 1. Line $a$ is connected with the frames or test-pieces of each of the switches $b$ and $c$. Thus connection $e$ extends to the test-piece of switch $b$ and connection $f$ to the test-piece of switch $c$. Telephone-line $g$ extends from ground at station 2, as shown in Fig. 1, through the spring-jack switches $h$ and $i$ on the different boards through the annunciator $k$, and thence through resistance $l$ at the central office to ground, said resistance being preferably of about three hundred ohms, as will be hereinafter explained. Line $g$, after passing through annunciator $k$, is connected with the insulated frame or test-piece of switch $i$, and also with the frame or test-piece of switch $h$. These same telephone-lines are illustrated in Fig. 2, line $a$ being connected, through series of spring-jack switches $b$, to $c$ and annunciator $d$, and thence through the test-pieces of said series of spring-jack switches back to station 1. Station 2 is connected by line $g$ with a series of spring-jack switches at the central office, beginning with switch $h$ and extending thence through the series to the last switch, $i$, and thence through annunciator $k$, and thence back through test-pieces of the switches through, say, three-hundred-ohms resistance $l$ and to ground.

As shown at Figs. 1 and 2, the normally-open ground-circuit $m$ includes a battery and a second winding upon the electro-magnet of the telephone $n$ and terminates in a movable contact piece or thimble, $o$. In making the test this thimble $o$ is touched to the test-piece of the switch of the line and the electrical condition of the line, is indicated by the operator listening at telephone $n$ in the manner hereinafter explained.

With each pair of cords I provide a switching device and circuit-connections with a vibrator, as illustrated more clearly in Fig. 2, in which $p$ may be a board kept in vibration by rheotome $p'$, or in any other suitable manner.

$p^2$ is a contact—say of platinum—resting upon some conducting material. This conducting material may be of low resistance, like carbon, or of high conductivity, like copper or platinum. I prefer that it should be a good conductor. Said contact $p^2$ is included in a ground-circuit which extends, preferably, in two branches $p^3$ and $p^4$, through resistance of, say, two thousand ohms, to contact-points $p^5$ and $p^6$, respectively, of the switch device, as shown in Fig. 2.

The switch will be more readily understood by reference to Fig. 4. When the upright lever $p^7$ is thrown forward, as indicated by the dotted lines, the springs $p^8$ $p^9$ are separated, and their ends coming against the springs $p^{10}$ $p^{11}$ spread said springs $p^{10}$ $p^{11}$ apart. Thus springs $p^{10}$ $p^{11}$ are disconnected, while spring $p^8$ is closed upon spring $p^{10}$ and spring $p^9$ is closed upon spring $p^{11}$. Thus by simply throwing lever $p^7$ forward the telephone $n$, which has its terminals connected with springs $p^8$ $p^9$, is brought into the circuit. On throwing the lever back to the position indicated by the full lines the telephone $n$ is disconnected and the clearing-out annunciator $p^{12}$ is brought into circuit.

As before stated, the ground-circuit, which includes contact $p^2$, divides in two branches, one branch, $p^3$, passing through resistance, preferably, of two thousand ohms to contact $p^5$ of the loop-switch. The other branch, $p^4$, passes through the same amount of resistance to the wire connecting the two coils of the clearing-out annunciator $p^{12}$ in one direction, and thence this branch extends to point $p^6$ of the loop-switch. Tracing through the other coil of clearing-out annunciator $p^{12}$, connection is made with point $p^{13}$ of the switch. It will be understood that said contacts $p^6$ and $p^{13}$ form the connections with clearing-out annunciator $p^{12}$. I have then one branch, $p^3$, extending to points $p^6$ and $p^{13}$ of the loop-switch, while the other branch, $p^4$, extends to contact $p^5$ of the loop-switch. It will be observed that contact $p^5$ is connected, through the medium of springs $p^{10}$ $p^{11}$, with contact $p^{14}$.

The loop-plugs $q$ $q'$ are of well-known construction, the strands $q^2$ $q^3$ of the different cords being connected with the tips of their respective plugs, while the strands $q^4$ $q^5$ are connected, respectively, with the sleeves or shanks of the plugs. These plugs, as shown more clearly in Fig. 1, are provided each with a metallic heel connected with the metallic sleeve thereof. These metallic heels normally rest upon metallic plates $q^6$ $q^7$ of their respective sockets. Plate $q^6$ is connected, as indicated, at $q^8$ with strand $q^2$, which leads to the tip of plug $q$. Plate $q^7$ in like manner is connected, as indicated, at $q^9$ with strand $q^3$, which leads to the tip of plug $q'$. When plugs $q$ and $q'$ rest, respectively, upon plates $q^6$ and $q^7$, a cross or connection will be established between the sleeve of each plug and the cord connecting with the tip thereof, and thus when one plug is inserted in a spring-jack switch and the other resting upon its plate the circuit will not be open between the tip and sleeve of the other plug.

I will now describe the manner of receiving a call, making the connection with the line, calling, testing the wire called for, and making the final connection between the calling subscriber's line and the line of the subscriber called for.

The operator at board 2, we will suppose, sees the shutter $k$ fall. She at once inserts loop-plug $q'$ in the spring-jack $i$ of the corresponding line, and, throwing the switch-lever $p^7$ forward, brings her telephone $n$ into the circuit. The circuit through the loop-switch to the telephone $n$ I have not illustrated in detail in Fig. 1. These circuits through the loop-switch will be understood by reference to Fig. 2. The operator listening at telephone $n$ receives the order sent in over line $g$ from station 2. We will suppose that subscriber at station 2 asks for connection with station 1. The operator at once proceeds to test line $a$ to determine whether or not the line is in use at any other of the boards. This test is made by touching the thimble or connection $o$ to the frame or test-piece of switch $c$. If the line is free, the operator listening at telephone $n$, when thimble $o$ is applied to the frame or test-piece of switch $c$, will hear no sound or buzz in her telephone, since no circuit will be formed to ground over said circuit $a$. If, however, the wire thus tested should be found in use, a hum or buzz would be heard in the telephone $n$ when the test was made, this hum being due to the closing of the battery-circuit $m$ through the vibrating contact $p^2$ of the testing apparatus. (Shown in Fig. 2 more in detail.) We will assume, however, that the line when thus tested is found free. The operator will thereupon insert the other plug, $q$, of the pair into the spring-jack $c$ of the line, thus looping the two lines together, as shown more clearly in Fig. 2. The connection between the two lines being thus completed, the operator throws the lever $p^7$ of the loop-switch back to its normal position, thus disconnecting the telephone $n$ and looping the clearing-out annunciator $p^{12}$ into circuit.

We will now suppose two lines connected together upon one board, as shown at board 2 in Fig. 1, and suppose one of these lines called for by another subscriber at another board—as, for example, by subscriber of station 3, whose annunciator $r$ is upon board 1. The operator at board 1 on seeing the shutter $r$ fall, as shown, inserts one plug, $r'$, of a pair in the spring-jack switch of the calling subscriber's line, at the same time throwing the lever of her loop-key forward to bring the telephone into circuit. Having received her order from the calling subscriber, she tests the line called for. We will suppose that the line called for is line $g$ of station 2. She at once touches the thimble $r^2$ of her testing apparatus to the test-piece of switch $h$, as shown. As line $g$ is already connected at board 2, the buzz will be heard in the telephone of the operator at board 1 when the test is made. The circuit thus closed, when thimble $r^2$ is touched to the frame of switch $h$, may be traced from ground by wire $r^3$ through battery $r^4$, through the extra winding on telephone $r^5$, thence by wire $r^6$ to thimble $r^2$, thence to the frame of switch $h$, and from the frame of switch $h$ over a portion of wire, $g$, to the frame of switch $i$, from the frame of switch $i$ to the sleeve of loop-plug $q'$, inserted therein, and thence by strand $q^5$ to wire $p^4$, and thence through the variable contact $p^2$ to ground.

In Fig. 1 I have not shown the resistance in wire $p^4$. Neither have I shown the branch $p^3$, also including resistance, as is illustrated in Fig. 2. The connection between strand $q^5$ and wire $p^4$ through the loop-switch, which is not illustrated in detail in Fig. 1, will be understood by reference to Fig. 2, as has been hereinbefore described. The operator at board 1, listening at telephone $r^5$, will hear the buzz in the telephone thus caused by the closing of battery $r^4$ through a circuit including a variable contact or connection, $p^2$. I have not traced the circuit from the test-piece of switch $h$ through resistance $l$, to ground. This resistance, it will be understood, is of sufficient amount to cause sufficient battery-current to flow through the variable resistance $p^2$.

If line $a$ were called for, which is a metallic circuit, circuit from battery $r^4$ would be closed through telephone $r^5$, through resistance $p^2$, when the thimble $r^2$ should be connected with the frame of switch $b$. The circuit would be from thimble $r^2$ to frame of switch $b$, thence by connections $f$ $e$ to frame of switch $c$, thence to sleeve of loop-plug $q$, thence by strand $q^4$ to contact $p^6$ of the loop-switch, (see Fig. 2,) and thence to wire $p^4$, and through resistance $p^2$ to ground.

As before stated, it is desirable that the circuit, including resistance $p^2$, should extend in two branches, $p^4$ and $p^3$, through resistance-coils, in order that when one of two connected metallic circuits is tested the different sides of the circuit may be properly balanced. Thus suppose telephone-line $g$ to be a metallic circuit, and instead of passing through resistance $l$ to ground at the central office to extend out to station 2, and suppose line $a$ and line $g$ looped together, as illustrated at board 2 in Fig. 1. On making the test at switch $h$, as shown, battery $r^4$ would find circuit through telephone $r^5$ to test-frame of switch $h$, and thence, as heretofore traced, through branch $p^4$ to ground in one direction. Tracing in the other direction from frame of switch $h$, the battery would be closed over wire $g$, through station 2, and back through the spring and contact of switch $h$, and thence to the spring of switch $i$, thence to the tip of plug $q'$, and thence by strand $q^3$ (see Fig. 2) to contact $p^{14}$, and thence through branch $p^3$ to the ground-wire containing the variable-resistance contact $p^2$. It is of especial advantage to provide two branches, $p^3$ and $p^4$, with high resistance in each branch, say two thousand ohms, and switching apparatus for connecting the branches with different sides of the united metallic circuit of two telephone-lines, as herein described, when the telephone-lines are run in cables, or so near each other that they will be subject to induced currents, since any currents induced upon the metallic circuit thus formed will escape to ground in two directions—that is, through high-resistance branch $p^3$ and through high-resistance branch $p^4$—instead of tending to escape to ground through the telephone in one direction, as is the case when only one side is grounded, as shown in Fig. 1. The two branches $p^3$ $p^4$ may be connected with a single ground-wire, including the vibrator $p^2$, as shown in Fig. 2; or, if desired, a different vibrator may be used in each of said branches. The generator $t$ is provided with contacts near the springs of the loop-switch, as shown. By throwing the lever $t'$ in one direction or the other signal-currents may be sent over either of the lines $a$ or $g$ to call the subscribers of said lines.

There are various modifications which would readily suggest themselves to those skilled in the art. I therefore do not limit myself to the construction shown.

Having thus described my invention, I claim as new and desire to secure by Letters Patent—

1. The combination, with telephone-lines, each connected with a different switch on each of two or more multiple switch-boards, of loop-plugs and cords for connecting the lines together on the different boards and in connection with each pair of cords a branch circuit to ground through a variable resistance and a ground-circuit, including a battery and a telephone or indicating device, and means for connecting said ground-circuit at any of the boards with the test-frame of any spring-jack switch thereon, whereby it may be determined at any given board whether a line wanted or called for is connected or in use at any other of the boards.

2. In a telephone-exchange, the combination, with two metallic circuit telephone-lines, each connected with a different switch on each of two or more multiple switch-boards and looped together upon one of the boards to form a complete metallic circuit, of a branch circuit to ground, containing a vibrating contact at the board where the lines are connected together and at one of the other boards a ground-circuit, and means for connecting said ground-circuit with the switch or test-piece of either of said united metallic circuits, whereby on observing or listening at the indicating apparatus included in said circuit when connection is made with the switch or test-piece of either line it may be determined whether either of said metallic circuits is connected or in use at another switch-board.

3. The combination, with a pair of loop-plugs and flexible cords connected therewith, of two telephone-lines looped together through said cords at one of two or more multiple switch-boards, branch connections through high resistance, say two thousand ohms, from each of said strands to ground, a vibrating contact being provided in each of said branches, and testing apparatus consisting of a ground-circuit, including a battery and telephone, and means for connecting said circuit to the switch of either of said lines at another board, whereby, when connection is made with either of said switches, a buzz will be heard in the telephone, while the different sides of said united metallic circuit will be balanced with respect to induced currents.

4. A testing apparatus consisting of a normally-open ground branch, $m$, including a battery and an extra winding upon the coil of a telephone, $n$, and a movable terminal connection, $o$, in combination with the different switches or terminals of telephone-lines upon a multiple switch-board, whereby connection may be made with any one of said switches or the test-piece of any of said switches, substantially as and for the purpose specified.

5. The combination, with the pivoted lever $p^7$, of insulated contact-springs on opposite sides thereof, between which the shank of said lever is adapted to be vibrated, the telephone $n$, provided with an extra winding connected between said springs, and the springs $p^{10}$ $p^{11}$ outside of the free ends of said springs $p^8$ $p^9$, against which springs $p^{10}$ $p^{11}$ the springs $p^8$ $p^9$ are adapted to be forced, respectively, to bring the telephone into circuit, substantially as and for the purpose specified.

6. The combination, with the strands of a pair of flexible cords provided with terminal loop-plugs, of a ground-circuit, including a vibrator, $p^2$, and branches $p^4$ and $p^3$, connected with said ground-circuit, and each including high resistance and extending each to a different one of said strands, and telephone-lines looped together by said loop-plugs, substantially as and for the purpose specified.

7. The combination, with the lever $t'$, pivoted as shown, of the insulated springs on contacts forming the connections, respectively, of strands $q^4$ $q^2$ and $q^3$ $q^5$ of the flexible cords, the loop-plugs of said cords inserted in the switches of two telephone-lines to connect said telephone-lines together, and a generator, $t$, with its contacts near said springs, whereby on moving said lever $t'$ current from said generator may be sent over the said lines, substantially as described.

8. The board or support $p$ and means $p'$ for keeping said board in vibration, in combination with contact $p^2$, connected to the united circuit of two telephone-lines, substantially as and for the purpose specified.

In witness whereof I hereunto subscribe my name this 26th day of May, A. D. 1888.

JOSEPH J. O'CONNELL.

Witnesses:
 CHAS. G. HAWLEY,
 CHAS. C. WOODWORTH.